United States Patent Office 3,326,785
Patented June 20, 1967

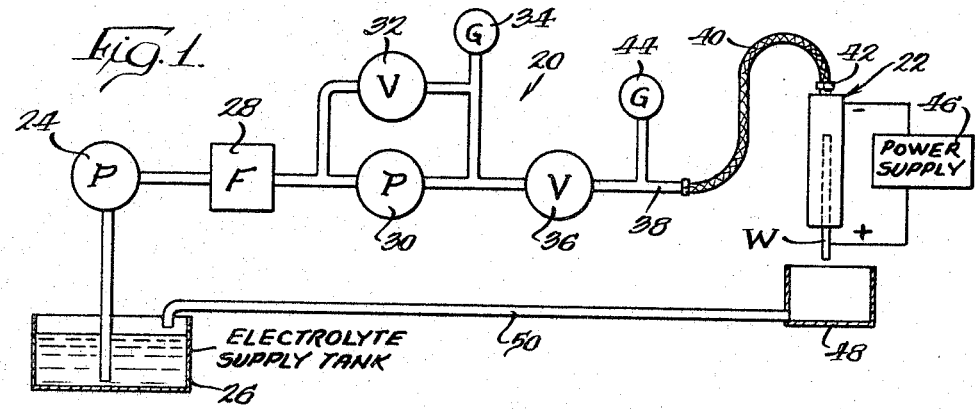
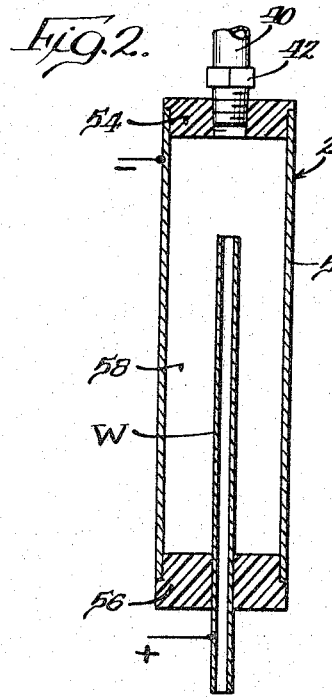
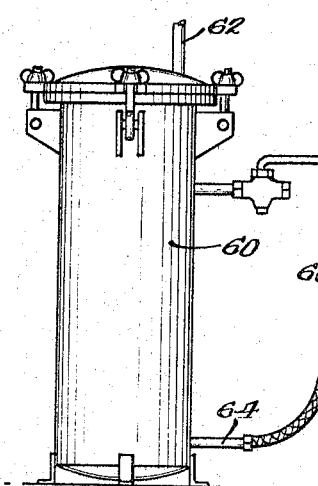
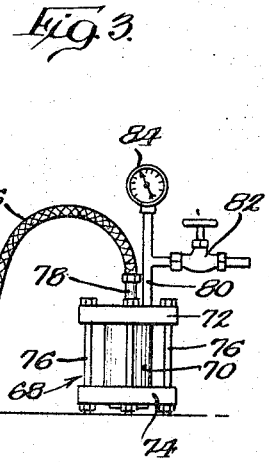
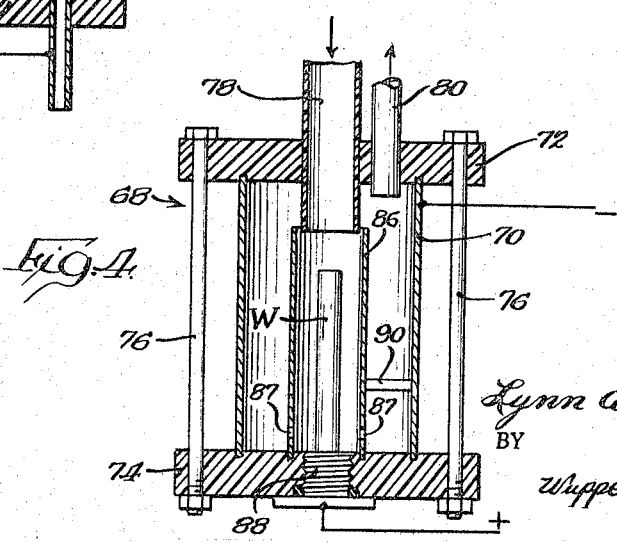

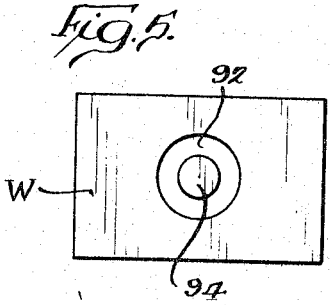
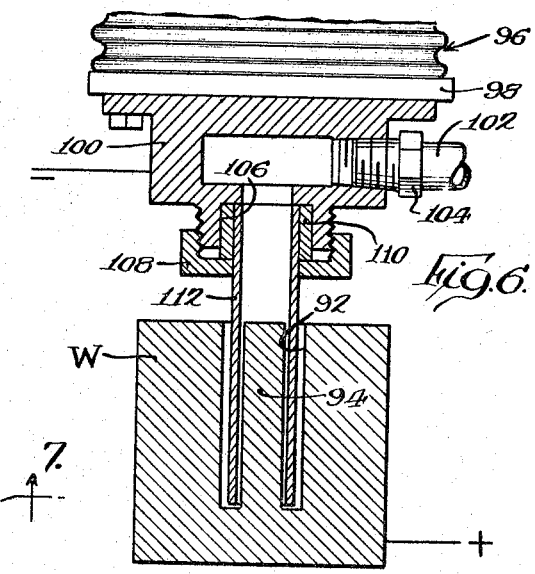
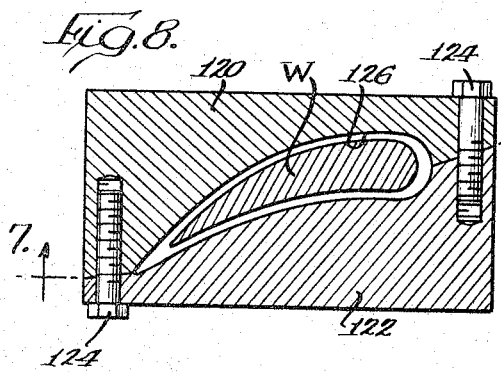
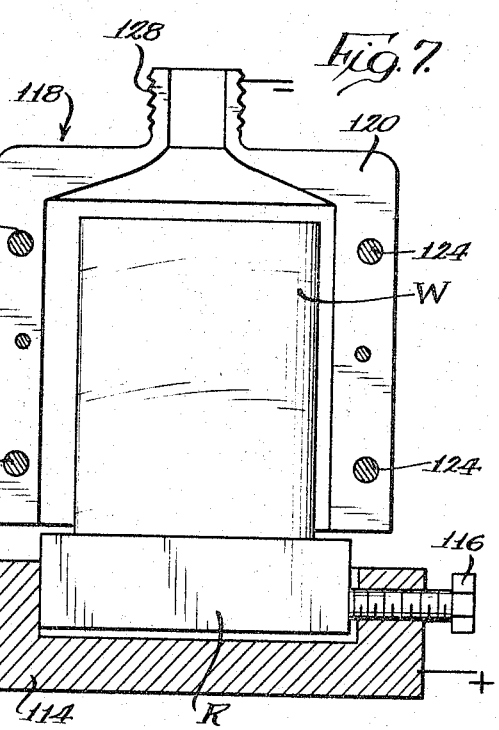
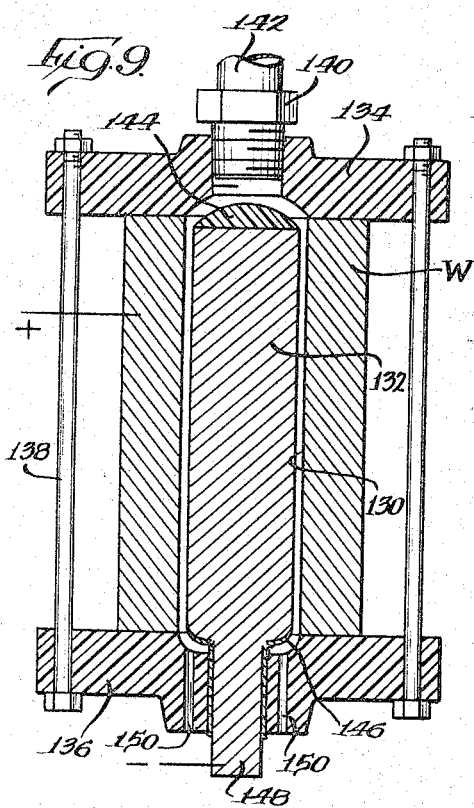

3,326,785
ELECTROLYTIC POLISHING APPARATUS AND METHOD
Lynn A. Williams, Winnetka, Ill., assignor to Anocut Engineering Company, Chicago, Ill., a corporation of Illinois
Filed Sept. 17, 1962, Ser. No. 223,923
10 Claims. (Cl. 204—140.5)

The present application is a continuation in part of the copending application of Lynn A. Williams, Ser. No. 772,960, filed Nov. 10, 1958, entitled Electrolytic Shaping, issued into Patent No. 3,058,895, dated Oct. 16, 1962, and Ser. No. 158,042, filed Dec. 8, 1961, now Patent 3,276,987, issued Nov. 29, 1966, entitled Electrolytic Shaping Apparatus, the latter application being a division of the former.

The present invention relates to improvements in the electropolishing of work materials and particularly in the electropolishing of electrically conductive and electrochemically erodable materials.

It is frequently desirable to impart a smooth and polished finish to the surface of the workpiece, whether initially machined by conventional machining techniques or by the electrolytic shaping process described in the above identified applications and in other applications of Lynn A. Williams, such for example as Ser. No. 73,154, filed Sept. 2, 1960, now Patent 3,275,543, Electrolytic Cavity Sinking Apparatus and Method, and Ser. No. 201,679, now Patent 3,287,246, filed June 11, 1962, for Electrolytic Shaping and Cavity Sinking Apparatus.

The use of electropolishing to obtain a fine surface finish on work materials is understood in the art and has been used for a great many years. The prior techniques involve placing the part to be polished in an electrolyte bath into which also is immersed one or more electrodes usually spaced in appreciable distance from the workpiece or workpieces. A small electric current is then passed between the workpieces and the electrodes and after the passage of a substantial amount of time, the desired finish is obtained. The electrolyte bath is operated at atmospheric pressure.

Such electropolishing techniques have not found extensive commercial utilization except in specialized applications, as usually the work is slow and the solutions required are costly and must be very carefully controlled for good results. When contaminated by use or otherwise, the special solutions have to be discarded or regenerated at great cost. Accordingly, most applications of electropolishing have been concerned with small work in relatively small quantities.

It has been discovered that some of the techniques of electrolytic shaping as disclosed in the foregoing applications are useful in connection with the electropolishing of work materials, and it has also been found that excellent surface finishes may be obtained on workpieces in a matter of seconds. Most important, it has now become possible to utilize low cost solutions, and a major object of this invention is to provide new apparatus and method to this end.

Another object of the present invention is to provide a new and improved apparatus and method for the electropolishing of electrically conductive and electrochemically erodable work materials in a very much shorter time than was possible with the previous techniques.

Another object is to provide a new and improved electropolishing method and apparatus utilizing simple salt electrolytes supplied at high pressure to the workpiece being electropolished.

Another object is to provide a new and improved electropolishing method and apparatus wherein the electropolishing current is of high density and low voltage.

Another object is to provide a new and improved electropolishing method and apparatus utilizing static pressure of the electrolyte on the workpiece.

Other objects and advantages will become apparent from the following description taken in conjunction with the accompanying drawings, wherein:

FIG. 1 is a schematic illustration of an electropolishing system utilizing the present invention;

FIG. 2 is a somewhat schematic medial sectional view showing of an electrode and workpiece of the type shown in FIG. 1;

FIG. 3 is a schematic illustration of another system utilizing electrolyte under static pressure;

FIG. 4 is a sectional view through the workpiece holder and electrode shown in elevation in FIG. 3;

FIG. 5 is a plan vew of a workpiece after an electrolytic shaping operation has formed an annular cavity in the workpiece;

FIG. 6 is a medial sectional view through an electrode and the workpiece of FIG. 5 illustrating a technique of obtaining a smooth and polished finish on the standing slug in the workpiece;

FIG. 7 is a view showing apparatus for applying an electropolished finish to an airfoil section and may be considered as being taken along line 7—7 of FIG. 8;

FIG. 8 is a transverse sectional view through the electrode and workpiece of FIG. 7; and FIG. 9 is a longitudinal sectional view through another arrangement for holding a workpiece during the electropolishing operation.

Referring first to FIGS. 1 and 2, it will be seen that an electrolyte feed system indicated generally by the reference character 20 for feeding electrolyte to an electrode structure 22 incorporates a low pressure pump 24 arranged to draw electrolyte from a tank or reservoir 26 and feed it through a filter 28 to a high pressure pump 30, the outlet of which leads to a bypass valve 32 which may be either manually set or be of the spring loaded constant pressure type. On the inlet side of the bypass valve 32 a pressure gauge 34 is mounted. The outlet side of the pump 30 and the inlet side of the valve 32 are connected to a valve 36 which may be a needle valve or some similar manually adjustable valve which leads through a pipe 38 and hose 40 to a fitting 42 connected to the electrode structure 22. A second gauge 44 is connected to the pipe 38 and indicates the pressure at the electrode. The capacity of the pipe 38 and hose 40 is such as to make the line pressure losses negligible and therefore the reading of the gauge 44 gives the actual pressure at the entry to electrode structure 22.

The electrolyte feed system just described is considered to be typical and other systems may be used, as for example, that shown in the aforementioned application of Lynn A. Williams, Ser. No. 73,154.

The electrolyte drained from the electropolishing operation is collected in a tray 48 and returned by gravity or other suitable means through a pipe 50 to the supply reservoir or tank 26.

As will appear presently, the electrode structure 22 in this particular instance is designed to support the workpiece W and is connected to the negative terminal of a power supply 46, the positive terminal of which is connected to the workpiece W.

The electrode structure 22 includes a tube 52 of copper which is plugged at both ends with insulating bushings 54 and 56, which may be made of Teflon, an epoxy resin, or glass fiber laminate. The fitting 42 is threaded into a tapped hole in the upper bushing 54. Into the bottom bushing 56 a tubular workpiece W is pressed. Suitable connections (shown diagrammatically) are made to the workpiece W and to the copper tube 52 from the positive and negative terminals, respectively, of the power supply 46.

Electrolyte is pumped through the hose 40, fitting 42 into the pressure chamber 58 formed by the copper tube 52 and its end bushings 54 and 56 and exits through the bore of the tubular workpiece W. Since this bore is relatively small, the pressure on the electrolyte in the chamber 58 read on the gauge 44 will be appreciable and is above 15 p.s.i. and preferably above 150 p.s.i.

While this is one form of electrode and arrangement tested, there is no requirement for exhausting the electrolyte through a tubular workpiece, as other shapes of workpieces and exhaust orifice or valve may be used as will appear hereinafter, and such exhaust may be connected into the insulating bushing 56 or if convenient into the insulating bushing 54. The inlet and exit and the sides of the chamber should be arranged so as to cause flow of the electrolyte over the workpiece W. While a circulation of electrolyte appears to be desirable and will often be used in combination with superatmospheric electrolyte pressure, it is not intended to suggest that velocity alone is regarded as a novel contribution to this art.

In the specific disclosure the workpiece W consisted of 18-8 stainless steel hypodermic needle tubing having an outside diameter of about .067" and inside diameter of .020". The needles were inserted through tight holes bored in the lower insulating bushing 56. The small bore in the tube served as the outlet orifice and permitted the development of electrolyte pressures in the chamber 58 in the order above mentioned.

At a potential of about 15 volts, a preliminary polish was obtained on the hypodermic needle tube W in six seconds and good polish was obtained in ten seconds. In the former case the diameter of the tube was reduced about .001", and in twelve seconds the diameter was reduced by more than .002".

The electrolyte solution used in these tests consisted of the following in 15 gallons of tap water:

| | Oz. |
|---|---|
| Potassium nitrate | 23.3 |
| Rochelle salt | 13.3 |
| Sodium nitrite | 18.6 |
| Potassium chloride | 28.0 |
| Calgon Banox | 4.8 |

However, other solutions including many like the one just described, not ordinarily regarded as electropolishing agents, yield similar results. For example, simple 20% solutions of sodium chloride or potassium chloride yield similar results. Apparently, in addition to superatmospheric pressure, the principal requirement is for a high current density on the work. In the instance noted, a removal rate of .002" (diameter) in 12 seconds means that a current density of about 50 amperes per square inch is called for. This is many times greater than the value used in conventional electropolishing. Accordingly, some flow of electrolyte is desired, and the solution should be of high conductivity and reasonably high ion mobility. However rust inhibiting agents such as sodium nitrite seem not to be harmful on super-alloys or stainles steel nor are complexing agents such as salts of the formic acid series.

The material referred to as Calgon Banox in the solution described above is described as sodium hexametaphate salts and the particular formula used in the above solution is designated by the proprietor as Banox 7–RS, releases sodium, zinc, and hexametaphosphate ions, and has the facility of keeping calcium, magnesium, and iron salts in solution. This material cannot be used successfully in any solution for working ordinary steel nor can sodium nitrite. In materials for ordinary steel, alkalinity in the solution should be avoided.

It is believed that the electropolishing action may be caused by relatively high pressure and high current density over the work surface. High velocities may aid in reducing the polarizing or passive film which is always tending to form on the anode at high current densities and also permit high current density without excessive localized heat or gassing. As a matter of theory, it is possible that the thickness of the anodic film is much reduced on any protuberance or minute point of the surface and much less marked at any depressed portion thus tending to attack the high points more rapidly. But this theory has not been validated and recently another theory (about to be published) has been proposed which seems more likely to be correct. It has been proposed to use rotating discs as cathodes, but there are several severe limitations on the practical usability of this means of attaining of high velocity in the electrolyte. For example, many irregular shapes of work can scarcely be approached by a rotating member in a uniform manner. In any case, such an arrangement does not assure the development of uniform high pressure over the work surface. So far as is known, the use of high pressure pumping for electropolishing is new. With the high velocity and the use of pressure of several atmospheres it is possible to operate at current densities which would otherwise (e.g., in an open tank) cause excessive gassing and even boiling, which prevents good polishing. It appears to be new to use high pressure in electropolishing systems to permit attainment of high current densities either for electropolishing or for rapid mass metal removal.

FIGS. 3 and 4 illustrate another form of apparatus used in electropolishing at superatmospheric pressure. This equipment includes a pressure tank 60 containing the electrolyte having an airline inlet 62 connected to an air compressor (not shown). A feed pipe 64 is connected by a hose 66 to an electromachining chamber 68.

The electromachining chamber 68 includes a stainless steel cylindrical wall 70 confined between a pair of glass fiber laminate headers 72 and 74. The headers 72 and 74 are held to the cylindrical wall 70 by appropriate tie bolts 76. An electrolyte inlet 78 connected to the hose 66 is fitted into the header 72 and an electrolyte outlet 80 is similarly fitted into the header 72. The outlet pipe 80 is fitted with a manual shutoff valve 82 and a gauge 84 which measures the static pressure on the electrolyte in the chamber 68 when the electropolishing operation is being conducted. The electrode per se comprises a cylindrical steel cathode member 86 aligned with the inlet 78 and arranged to receive the electrolyte directly from the inlet. The electrolyte flows down through the cathode member and out through holes 87 adjacent its lower end.

The workpiece W consisting of a rod ¼" in diameter and 2" long of type 304 stainless steel is secured as by soldering to a steel specimen holder 88 comprising a plug screwed into the center of the bottom header 74.

In the particular unit shown, steel cathode member 86 is ¾" in diameter and 2½" long so that it provides an exact ¼" spacing all around the workpiece W. The cathode tube is electrically connected at 90 to the steel shell 70 so that the two are at the same potential and the shell is connected to the negative terminal of the power supply, and the specimen holder 88 and therefore the workpiece W are connected to the positive side of the power supply, much in the manner previously discussed.

In preparing the apparatus of FIGS. 3 and 4 for operation the specimen workpiece W is soldered to the holder 88 and the surface of the workpiece cleaned with acetone to remove any oil or other extraneous material. The workpiece W and the holder 88 are inserted into the chamber by screwing the holder 88 into the tapped opening in the header 74. The electrical connections are made to the holder and to the cylinder 70 from the power supply.

Pressurized electrolyte in the tank 60 is flowed into the electromachining chamber 68 through the inlet 78 with the outlet valve 82 open. When air bubbles are no longer present or evidenced in the outlet stream, the valve 82 is closed and the outlet flow stopped, thereby trapping electrolyte within the chamber. The flow is obtained and the pressure is supplied from the pressure pump by pumping air onto the surface of the electrolyte in the tank 60 so that this pressure is applied to the electrolyte within the electromachining chamber 68. When the desired pressure is reached, the system is maintained either in the static or flowing condition, as desired, and the electrolyzing current is turned on. The static condition is obtained by closing the valve 82, and the flowing condition by opening the valve sufficiently to obtain the desired back pressure as shown on gauge 84.

A number of tests were made with the electrolyte being an aqueous solution of sodium chloride in the formula of 24 oz. of sodium chloride salt per gallon of water. The temperature of the electrolyte was at ambient temperature prior to machining and the temperature of the electrolyte was measured after machining. A number of tests were made on type 304 stainless steel to ascertain the effect of static pressure without any power-induced flow or velocity. These tests indicate no usable polishing range between 3 and 11 volts, between 30 and 480 seconds and between 80° and 90° F. As the pressure was increased to 80 p.s.i., a polishing range was found between 5 and 11 volts in a 60-second period and between 80° and 90° F. A similar range was found at 120 p.s.i. between 5 and 11 volts, 80° and 90° and between 30 and 60 seconds.

These parameters are not presented as limits. For example, 11 volts happened to be the maximum available with the equipment used; no effort was made to test with temperatures other than those occurring in the ambient condition, and the duration of exposure was carried only long enough to show clear evidence of polishing if any was to be obtained. The current densities in the electropolishing range tested varied from 12.75 amperes per square inch up to 25.5 amperes per square inch, the highest level tested. No electropolishing was found under any of these static test conditions below 12.75 amperes per square inch. However, even at 12.75 amperes per square inch up to 25.5 amperes per square inch no electropolishing occurred below 80 p.s.i. electrolyte pressure.

From the foregoing it will be apparent that when the electrolyte is at atmospheric pressure, no bright electropolishing range was found. This confirms the knowledge gleaned from the prior art in view of the fact that the maximum voltage used in these tests was 11 volts and the maximum current density at that voltage was 25.5 amperes per square inch. It did not appear to make a great deal of difference that the polishing time be increased as all that was gained was a slight increase in the amount of metal removed with no appreciable improvement in the finish on the workpiece W.

As the pressure in the system was increased from atmosphric to 40 p.s.i., 80 p.s.i. and 120 p.s.i., the minimum current density needed to produce an electropolished surface was decreased For example, at 40 p.s.i. no elctropolished surface was obtained. However, when the pressure was doubled, a smooth surface was found at 25.5 amperes per square inch provided the electropolishing time was doubled to sixty seconds. At 120 p.s.i. electropolishing was obtained at a current density of 12.75 amperes per square inch and 5 volts. While it was not possible to provide in these tests a current density higher than 25.5 amperes per square inch, it can be stated with no hesitancy that higher current densities will provide a smoother surface and the amount of metal removed will be greater for equivalent times or less time will be needed for equivalent material removal with the same smooth electropolished surface.

In all of the cases the workpieces W were covered with a black smut after the electromachining. This smut was non-adherent and was readily wiped from the pieces. From the work which was done in arrangement such as that shown in FIGS. 1 and 2, it is probable that the smut could be prevented by permitting the electrolyte to flow during the electromachining.

Similar tests were made on other electrolytically conductive and electrolytically erodable workpieces under static and flowing electrolyte conditions with results consistent with the foregoing.

These results lead to certain conclusions which are important from the standpoint of obtaining good electropolishing results at rapid rates and on a commercial basis.

(1) For most materials, increasing the pressure of the electrolyte decreased teh current density at which electropolishing occurred provided the pressure was appreciable, namely, 40 pounds per square inch or over.

(2) Increasing the electrolyte pressure and increasing the current density reduces the time required for obtaining good electropolished finishes.

(3) Voltage except in so far as it is required to obtain a particular current density has no effect and the final temperature of the electrolyte within the narrow range tested appears to play no significant part but from experiments, higher temperature will be of value with some materials, e.g., titanium alloys.

FIGS. 5 through 9 show various means for electropolishing typical workpieces in commercial type environments.

Referring first to FIGS. 5 and 6, there is shown a workpiece W having a cavity 92 of annular configuration formed therein leaving an upstanding slug or stud 94. This type of cavity is made on a machine of the type shown, for example, in the aforementioned applications of Lynn A. Williams, Ser. Nos. 73,154 or 201,679, by advancing into the workpiece an electrode of tubular configuration having a peripheral lip at its working tip and insulation on its exterior and interior surfaces to minimize stray electrolysis. A particularly effective type of electrode is shown and described, for example, in the copending application of Lynn A. Williams, Ser. No. 144,697, filed Oct. 12, 1961, now Patent 3,218,248 entitled Electrolytic Cavity Sinking Apparatus and Method. Inasmuch as the electrode is insulated on both its interior and exterior surfaces, the stud or slug 94 will remain and project interiorly of the electrode at the conclusion of the cavity sinking operation. The cavity 92 is formed to the desired depth by advancing the electrode into the workpiece W under the proper conditions of feed rate, electrolyte feed pressure, and electrolyzing current voltage and density.

It has been found as a practical matter that the finish on the upstanding slug 94 can be made rather smooth by the appropriate design of the electrode, the proper choice of electrolyte and by the maintenance of superatmospheric pressure in the electrolyte against the side walls of the center slug. Still the finish with most materials will be dull and in some materials it will be somewhat rough, particularly in the run of the slug extending back above the base where it connects to the parent workpiece. Around the neck at the point of the connection to the parent workpiece there usually will be a bright or smooth band, but then the surface above that will be somewhat pitted. It is theorized that this finish is caused by stray electrolysis extending from the working tip of the electrode up through the electrolyte and against the slug itself. It appears to be, therefore, that as the electrode proceeds into the work, it first produces a high finish where the high intensity electrolysis occurs. And subsequently the surface becomes roughened by low density current and low intensity electrolysis which causes etching in an irregular and unpredictable manner.

To improve the finish on the center stud 94, that is the outer cylindrical wall of the stud on which it is desired to have a smooth finish, an arrangement such as that shown in FIG. 6 has been successfully used.

FIG. 6 shows a small portion of an electrolytic shaping apparatus of the type shown in applications, Ser. Nos. 73,154 and 201,679, and it includes a ram 96 adapted to be moved forwardly in a work area by a drive mechanism at a constant rate which is regulatable. A ram plate 98 is mounted on the forward end of the ram and to that is secured a manifold 100. The manifold is connected to a source of electrolyte under pressure by a hose 102 and fitting 104 very much in the manner shown in FIG. 1 herein or in the aforementioned applications, Ser. Nos. 772,960, 73,154 and 201,679. The manifold is adapted to support electrodes of various types in a seat 106, the electrode being prevented from removal by means of a ring nut 108 and packing washer 110. It is understood that all of these elements are made of electrically conductive materials so that the electrode may be connected into the negative side of the power supply.

The cavity 92 is ordinarily formed by an electrode of the type having a lateral flange and insulated both externally and internally to provide the upstanding center slug or stud 94. The cavity 92 is formed to the appropriate depth by the advancement of the ram. The position of the advancement is noted on the depth gauge which is a part of the electrolyte machining apparatus. After the cavity 92 has been formed, the electrode is withdrawn, and an electropolishing electrode 112 substituted therefor. This electrode is similar to the previous electrode in that it is made of copper or brass, but differs in that it has smooth outer and interior surfaces, both of which are uninsulated. It fits over the center slug 94 with a clearance of as little as .010″ and up to .125″ or more if space permits. This electrode is of known length and after it has been substituted for the electrode which formed the cavity 92, the ram is advanced toward the workpiece so as to project the electrode 112 into the cavity 92 substantially to its full depth as shown in FIG. 6. A relatively small clearance is left at the tip of the electrode, perhaps in the order of .005″ to .010″. This clearance is not nearly as important as its relationship to the available input of the electrolyte for it is desired to be sure of maintaining the electrolyte pressure within the bore of the electrode 112 above 15 p.s.i. and preferably above 150 p.s.i.

While the electrode 112 is shown uninsulated on both its interior and exterior surfaces, this is done for the purpose of illustrating electropolishing the outer surface of the slug 94 with the assumption that the interior surface and accuracy of the hole are of no importance. On the other hand, if the wall of the cavity is to be polished, then a different arrangement is involved and the electrolyte will be pumped around the outside of the electrode and will exit through the center in the manner shown in the copending application of Joseph L. Bender and Lynn A. Williams, Ser. No. 37,766, filed June 21, 1960, now Patent 3,214,360, for Electrolytic Cavity Sinking Apparatus and Method and in the copending application of Lynn A. Williams, Ser. No. 212,916, filed July 27, 1962, now Patent 3,254,013, for invention entitled Electrolytic Cavity Sinking Apparatus and Method.

After the electrode of FIG. 6 has been positioned, as previously described with a full length of working surface adjacent the stud 94, the electrolyte pump is turned on and the electrolyte is pumped through the hose 102 until the desired static pressure as indicated by the gauge, such as the gauge 44, has been reached. The hose and passages are large enough so that there is relatively little loss of pressure on this account. When the flow has been established, electrolyzing current is turned on by energizing the power supply and using a voltage which depends somewhat upon the spacing distance between the electrode 112 and the slug 94. Commonly, 15 volts will be employed, but with somewhat closer spacing, voltages as low as three to four volts may be successfully used and at the other end the voltage may be carried as high as 40 volts or even higher. What is important is that the current density as applied to the surface of the slug should be in the order of a minimum of 13 amperes per square inch. Better results will be obtained at 30 or 40 amperes per square inch and preferably at about 100 amperes per square inch or more. Good results have also been obtained at current densities of 1000 or more amperes per square inch.

It has been found that even when using electrolytes composed of common salts, sodium chloride and water for example (one pound of sodium chloride to one gallon of water), or the foregoing solution to which has been added sodium nitrate in the proportion of from ¼ pound per gallon to one pound per gallon, a very rapid polishing effect occurs particularly on stainless steel and high nickel or high cobalt forged or rolled alloys. Depending somewhat upon the initial roughness and depending also upon the current density, the electropolishing will occur in a period of three to four seconds as a short treatment time up to perhaps 30 seconds or even one minute for a longer treatment time.

In the form of the invention disclosed in FIGS. 5 and 6, it might appear erroneously that the cavity 92 must be annular or circular or circumferential in shape. This is by no means true, and it may take any number of a variety of shapes, and the cavity may be discontinuous in its configuration; that is, it may be serpentine or crescent shaped, with the two ends of the cavity separated by a solid wall. Under the latter circumstances it might very well be preferable that the electrode 112 be so configured and so spaced from the walls of the cavity that electropolishing of all the walls of the cavity takes place. Under these circumstances it might be desirable that the exit from the cavity be restricted so that the electrolyte is pressurized as shown, for example, in Fig. 24 of Lynn A. Williams application, Ser. No. 772,960, and in Lynn A. Williams application, Ser. No. 212,916 previously mentioned herein.

FIGS. 7 and 8 illustrate how the teachings of this invention may be applied to a trepanned workpiece W having a root section R. The workpiece W, as shown in airfoil section, which is to be electropolished, may very well be a turbine bucket or some similar article of commerce. The root R is held in a mounting block 114, and is secured therein by a heavy set screw 116. The mounting block is fixed in the electrolytic machine and connected to the positive side of the electric power supply, and an electrode 118 carried on a ram, such as the ram 96 shown generally in FIG. 6, is advanced so that the electrode telescopes over the workpiece W. The electrode is made in two parts 120 and 122 secured together by bolts 124 to define a cavity 126 conforming generally in transverse section to that of the airfoil section of the workpiece W. The two sections 120 and 122 of the electrode when joined together form a channel 128 adapted to be connected to the electrolyte supply hose or the manifold supplying electrolyte to the cavity 126, this electrolyte of course being supplied under the pressure and being of the character hereinbefore discussed.

It should be noted that the cavity 126 leaves generally a uniform opening or envelope all around the workpiece W. The effect of doing this at the leading and trailing edges of the airfoil workpiece is to elongate the opening 126 relative to the sides of the workpiece W. One of the reasons for this is that the total surface of the electrode 118 under these circumstances is always bigger than the total surface of the workpiece W, which is on the inside of the electrode. Unless the leading and trailing portions of the electrode are carried back away from the workpiece W, the result will be a concentration of attack from the relatively large area of the electrode 118 onto the relatively small adjacent area of the workpiece, thereby effecting a greater rate of workpiece removal and a smaller section at these portions of the workpiece W than is desired.

With respect to the embodiment illustrated in FIGS. 6 and 7, it should be noted that the characteristics of the electrolyte and electrolyzing current are the same as those described hereinbefore with respect to the preceding embodiments.

FIG. 9 shows an arrangement for enlarging and polishing an internal bore 130 in a workpiece W. As shown, it is contemplated that the bore 130 will be round, but of course this need not be the case. It may take any one of a variety of shapes of sectional configuration, and may even be of a varying dimension and size from one end to the other, provided of course it is possible to insert the electrode into the hole. Electrode 132 should fit within the bore 130 in the workpiece W with a gap distance in the range indicated above. The two ends of the workpiece preferably are clamped between insulating blocks 134 and 136 held together by tension bolts 138, with the blocks being made of glass fiber laminate or the like. The upper insulating block 134 is connected by means of a fitting 140 and hose 142, which corresponds to the hose 40 of FIG. 2, to a source of electrolyte under pressure so that electrolyte under pressure may be introduced into the space between the electrode 132 and the inner wall or surface of the bore 130 of the workpiece W. Preferably at the inlet end of the workpiece the electrode is fitted with an insulating cap 144 made of glass fiber laminate, Teflon, epoxy resin, or some similar material so as to smooth the flow of electrolyte and to prevent excess turbulence therein as it enters the gap between the electrode 132 and the surface of the bore 130 in the workpiece W.

The electrode 132 is supported in the insulating block 136 at the end remote from the fitting 140, and is insulated at 146 by an epoxy resin so as to prevent stray electrolysis. The electrode is fitted with a projecting portion 148 secured in the insulating block 146 to provide a connection to the negative terminal of the power supply. Also it should be noted that the insulating block is provided with electrolyte exit holes 150 of such size and configuration as to provide sufficient back pressure to maintain a pressure of well above 15 p.s.i. and preferably above 150 p.s.i. on the electrolyte in the gap between the electrode 132 and the surface of the bore 130.

It has been found that this particular arrangement has a very interesting effect in that the size of the hole or opening 130 can be very closely controlled.

The voltage of the electrolyzing current is set at some predetermined level, for example 15 volts, and is held at this level with very careful regulation which is known now in this art. The electrolyte is maintained at a more or less constant concentration and may be of one of the various types of electrolyte hereinabove discussed. Cooling and heating coils are provided as disclosed in the copending application, Ser. No. 73,154, so as to maintain the electrolyte temperature as it enters the work at approximately a constant pre-established value of 110° F. to 150° F. Means are provided for valving the flow of electrolyte as previously discussed herein, so as to hold the electrolyte at an established pressure as selected. All of these regulations—voltage, temperature of the electrolyte, concentration of the electrolyte, and pressure—may be accomplished either by manual control or by automatic means. Referring to FIG. 1, hereof, it is contemplated that these controls be effected manually. However, it is within the skill of the art that they be effected automatically.

When the electrolyzing current is turned on, the hole 130 in the workpiece will be enlarged and will be electropolished. As it increases in size, the gap distance from the electrode 132 to the surface of the cavity increases and the electrolyzing current amperage falls. By referring to an ammeter, the current in the circuit is allowed to fall to some predetermined value, and thereupon the operation is stopped. This operation, of course, may be manual, although it is perfectly capable of being automatic. In any event, when the amperage falls to a predetermined level, the electrolyzing operation is stopped and it will be found that the size of the hole 130 in various workpieces will be substantially the same, and in this way sizing of the cavity as well as electropolishing can be accomplished. While it has been common to use direct current with the workpiece an anode, good results can be obtained with alternating current provided that the electrode (as distinguished from the work) is not subject to rapid anodic attack. Graphite may be used or rhodium or platinum for this purpose. The use of alternating current is contemplated as falling within the scope of the invention, and its use in electrolytic shaping is disclosed in the copending applications of Lynn A. Williams, Ser. No. 187,902, filed Apr. 16, 1962, entitled Electrolytic Removal Apparatus and Method, and Ser. No. 222,319, filed Sept. 10, 1962, entitled Multiphase Electrolytic Removal Apparatus.

It is submitted, therefore, that from the foregoing description it is apparent that the objectives which are claimed for this invention at the outset of this specification have been attained.

While various preferred embodiments of the new and improved electrolytic polishing apparatus and method constituting the present invention have been shown and described, it will be apparent that numerous modifications and variations may be made therein without departing from the underlying principles of the invention. It is therefore intended by the following claims to include all such variations and modifications by which substantially the results of this invention may be obtained through the use of the same or equivalent means.

What is claimed as new and desired to be secured by United States Letters Patent is:

1. The method of electropolishing electrically conductive and electrochemically erodable workpieces comprising positioning in a stationary manner and electrode having a working face of an area approximately equal to that of the surface of the workpiece to be polished so that the electrode working face and the workpiece surface are spaced a distance not greater than about .250" flowing an electrically conductive electrolyte into the space between the electrode working face and the workpiece surface, applying a static pressure to the electrolyte in the aforesaid space of at least 15 pound per square inch gauge, and passing a low voltage high density electrolyzing current between the workpiece and the electrode for a period of time not longer than about 60 seconds, the electrolyzing current having a voltage of at least about four volts and a current density of at least about seven amperes per square inch.

2. The method of electropolishing electrically conductive and electrochemically erodable workpieces comprising bringing an electrode having a working face of an area approximately equal to that of the surface of the workpiece to be polished into a stationary electropolishing position adjacent the workpiece surface so that the space therebetween will be not greater than about .250", flowing an electrically conductive electrolyte into the space between the electrode working surface and the electrode working face and the workpiece surface, applying a pressure to the electrolyte in the aforesaid space of at least about 15 pounds per square inch gauge, and passing a low voltage high density electrolyzing current between the workpiece and the electrode for a period of time not longer than about sixty seconds, the electrolyzing current having a voltage of at least about four volts and a current density of at least about 7 amperes per square inch.

3. The method of electropolishing electrically conductive and electrochemically erodable workpieces comprising bringing an electrode having a working face of an area approximately equal to that of the surface of the workpiece to be polished into a stationary electropolishing position adjacent the workpiece surface so that the space therebetween will be not greater than about .250", pumping an electrically conductive electrolyte into and through the space between the electrode working face and the workpiece surface, applying a resistance to the exit of electrolyte from the space so that pressure on the electrolyte in the aforesaid space is at least about 15 pounds per square inch gauge, and passing a low voltage high density direct current between the workpiece and the electrode in a sense to make the workpiece anodic for a period of time not longer than about sixty second, the electrolyzing current having a voltage of at least about four volts and a current density of at least about 13 amperes per square inch.

4. The method of electropolishing electrically conductive of electrochemically erodable workpieces comprising bringing an electrode having a working face of an area approximately equal to that of the surface of the workpiece to be polished into a stationary electropolishing position adjacent the workpiece surface so that the space therebetween will be in the range between .010" and .250", flowing an electrically conductive electrolyte into the space between the electrode working face and the workpiece surface, applying a pressure to the electrolyte in the aforesaid space in the range between 15 and 350 pounds per square inch, and passing a low voltage high density direct current between the workpiece and the electrode in a sense to make the workpiece anodic for a period of time between three seconds and sixty seconds, the electrolyzing current having a voltage between four volts and forty volts and a current density between about 7 and 8,000 amperes per square inch.

5. In an electrolytic apparatus for forming a high finish on an electrically conductive and electrochemically erodible workpiece, means for supporting the workpiece in a stationary position, an electrode having a working face adapted to be placed about and in close spacing distance to the surface of the workpiece to be finished to define a working space therebetween, said electrode working face conforming in shape to that of the workpiece surface and being in size approximately equal to that of the workpiece surface to be finished, means supporting said electrode in a stationary manner in said position, means defining an electrolyte inlet to the working space, electrolyte supply means including an electrolyte pump connected to said electrolyte inlet to deliver electrolyte under pressure to the working space, means defining an electrolyte outlet from the working space, highly restrictive flow means at said electrolyte outlet cooperating with said electrolyte pump for maintaining superatmospheric pressure on the electrolyte in the working space, and electrtric circuit means connected to the workpiece and to said electrode for passing an electrolyzing current therebetween in a sense to make the workpiece anodic and through the electrolyte in the working space.

6. The combination set forth in claim 5, wherein said highly restrictive flow means comprises an adjustable valve which may be turned to closed position thereby to place a static superatmospheric pressure on the electrolyte in the working space.

7. The combination set forth in claim 5, wherein said electrode is hollow to enclose the workpiece and said working face is internally of said electrode.

8. In an electrolytic apparatus for morwing a high finish on an electrically conductive and electrochemically erodible workpiece, means forming a closed chamber having electrolyte inlet and exit openings, said chamber providing space for housing the workpiece and an electrode, means for supporting the workpiece in a stationary position in said chamber, means providing a stationary electrode in said chamber having a working face conforming in shape to that of the workpiece and of an area at least approximately equal to that of the workpiece surface to be finished, electrolyte supply means including an electrolyte pump connected to said inlet opening for pumping an electrolyte to and through said chamber under superatmospheric pressure to insure contact with said electrode working face and the workpiece surface to be finished and the rapid replenishment of the electrolyte in said chamber, means at said exit opening cooperating with the said electrolyte pump for maintaining greatly superatmospheric pressure on the electrolyte in said chamber, and electrolyzing current circuit means connected for passing an electrolyzing current between said electrode working face and the workpiece surface to be finished in a sense to make the workpiece surface anodic.

9. The combination set forth in claim 8, wherein the area of said electrode working face is substantially greater than the area of the workpiece surface to be finished, whereby the density of the current on the workpiece surface is substantially greater than that on said electrode working face.

10. The combination set forth in claim 8, wherein said means at said exit opening comprises a flow restricting means whose characteristics are such that in cooperation with said pump it maintains a superatmospheric pressure on the electrolyte in said chamber.

References Cited

UNITED STATES PATENTS

| | | | |
|---|---|---|---|
| 2,859,157 | 11/1958 | Curtiss | 204—26 |
| 2,873,236 | 2/1959 | Ferris | 204—95 |
| 3,058,895 | 10/1962 | Williams | 204—143 |

FOREIGN PATENTS

| | | |
|---|---|---|
| 335,003 | 9/1930 | Great Britain. |

OTHER REFERENCES

Gusev et al.: Nauka I Zhizn', "Electrical Working for Metals," excerpted from pp. 25 and 26, No. 12, 1964.

Kehl et al.: A.E.C. Pub. NYO–3166, "Electrolytic Cutting of Metals," 28 pages, No. 1, 1951.

Lazerenko et al.: Stanki I Instrument, "Electric Spark Method for the Machining of Metals," excerpted from vol. 17, No. 12, pp. 8–11 (1946), and vol. 18, No. 2, pp. 4–8 (1947). (Pages 22–24 of the translation relied upon.)

JOHN H. MACK, Primary Examiner.

R. L. GOOCH, R. HARDER, R. K. MIHALEK, Assistant Examiners.

Dedication 3,326,785.—*Lynn A. Williams*, Winnetka, Ill. ELECTROLYTIC POLISHING APPARATUS AND METHOD. Patent dated June 20, 1967. Dedication filed Dec. 23, 1971, by the assignee, *Anocut Engineering Company*.

Hereby dedicates to the Public the portion of the term of the patent subsequent to Dec. 24, 1971.

[*Official Gazette April 18, 1972.*]